United States Patent
Montiani Carvalho et al.

(10) Patent No.: US 12,229,773 B2
(45) Date of Patent: *Feb. 18, 2025

(54) IDENTITY AUTHENTICATION SYSTEMS AND METHODS

(71) Applicant: VISA INTERNATIONAL SERVICE ASSOCIATION, San Francisco, CA (US)

(72) Inventors: Beatriz Montiani Carvalho, San Paulo (BR); Rogerio Cazelato, Miami, FL (US); Juan Amezcua, Bogota (CO); Belkis Barral, Miami, FL (US); Gabriela Castillo, Polanco (MX)

(73) Assignee: Visa International Service Association, San Francisco, CA (US)

( * ) Notice: Subject to any disclaimer, the term of this patent is extended or adjusted under 35 U.S.C. 154(b) by 300 days.

This patent is subject to a terminal disclaimer.

(21) Appl. No.: 17/843,342

(22) Filed: Jun. 17, 2022

(65) Prior Publication Data

US 2022/0318803 A1    Oct. 6, 2022

Related U.S. Application Data

(63) Continuation of application No. 17/273,241, filed as application No. PCT/US2019/049363 on Sep. 3, 2019, now Pat. No. 11,392,946.

(Continued)

(51) Int. Cl.
G06Q 20/40     (2012.01)
G06F 21/32     (2013.01)

(52) U.S. Cl.
CPC .......... *G06Q 20/401* (2013.01); *G06F 21/32* (2013.01); *G06Q 20/40145* (2013.01)

(58) Field of Classification Search
CPC .......... G06Q 20/401; G06Q 20/40145; G06Q 20/3829; G06F 21/32; G06F 17/30; H04L 9/32

(Continued)

(56) References Cited

U.S. PATENT DOCUMENTS 11,392,946 B2   7/2022  Montiani Carvalho
2006/0235795 A1  10/2006  Johnson
(Continued)

FOREIGN PATENT DOCUMENTS

CA    2882887 A1    5/2013
CN    102812488 A   12/2012
WO    WO-2015114554 A1 *  8/2015  ............. G06Q 20/12

OTHER PUBLICATIONS

Chinese Office Action (with English translation) for App. No. CN201980056708.X, dated Oct. 12, 2021, 17 pages.

(Continued)

*Primary Examiner* — Hani M Kazimi
*Assistant Examiner* — Sanjeev Malhotra
(74) *Attorney, Agent, or Firm* — K&L Gates LLP (57) ABSTRACT

A computer-implemented method comprising receiving a transaction request from a merchant server. In response to receiving the transaction request, the method includes requesting authentication from a computing device associated with a user payment account and a requesting that a merchant re-submit the transaction request. The method includes receiving an authentication parameter from the computing device, and determining that the authentication parameter matches an authentication parameter of the user payment account. The method includes receiving a re-submission of the transaction request from the merchant server and, based on the determination that the authentication parameter received from the computing device matches (Continued)

the authentication parameter associated with the user payment account, approving the transaction request.

20 Claims, 5 Drawing Sheets

Related U.S. Application Data (60) Provisional application No. 62/726,983, filed on Sep. 4, 2018.

(58) Field of Classification Search
USPC .............. 705/35, 44, 71, 41; 726/4; 713/170; 707/703
See application file for complete search history.

(56) References Cited

U.S. PATENT DOCUMENTS

| | | | | |
|---|---|---|---|---|
| 2010/0115277 | A1* | 5/2010 | Roscoe | H04L 9/3215 713/170 |
| 2011/0035788 | A1* | 2/2011 | White | G06F 21/577 726/4 |
| 2012/0191681 | A1* | 7/2012 | Yamamoto | G06F 11/1474 707/703 |
| 2012/0323786 | A1 | 12/2012 | Kirsch | |
| 2013/0030972 | A1* | 1/2013 | DiGioacchino | G06Q 20/407 705/35 |
| 2013/0099891 | A1 | 4/2013 | Nandakumar | |
| 2013/0159021 | A1 | 6/2013 | Felsher | |
| 2014/0222684 | A1 | 8/2014 | Felsher | |
| 2015/0019443 | A1* | 1/2015 | Sheets | G06Q 20/3829 705/71 |
| 2015/0052064 | A1* | 2/2015 | Karpenko | G06Q 20/3227 705/71 |
| 2015/0088754 | A1 | 3/2015 | Kirsch | |
| 2015/0088756 | A1* | 3/2015 | Makhotin | G06Q 20/12 705/71 |
| 2015/0339661 | A1* | 11/2015 | Li | G06Q 20/38 705/41 |
| 2016/0012216 | A1 | 1/2016 | Attfield | |
| 2016/0125412 | A1* | 5/2016 | Cannon | G06Q 20/4014 705/44 |
| 2017/0070484 | A1* | 3/2017 | Kruse | H04L 9/14 |
| 2017/0195319 | A1* | 7/2017 | Gerber | G06Q 20/34 |
| 2017/0237739 | A1* | 8/2017 | Nandakumar | H04L 63/0407 705/44 |
| 2017/0357971 | A1* | 12/2017 | Pitz | H04W 4/021 |
| 2017/0357977 | A1* | 12/2017 | Pitz | G06Q 20/4016 |
| 2019/0007395 | A1* | 1/2019 | Gerber | G06Q 20/40 |
| 2019/0197523 | A1* | 6/2019 | Li | G06Q 20/38 |
| 2019/0213585 | A1* | 7/2019 | Patni | H04L 63/0838 |
| 2019/0306142 | A1* | 10/2019 | Gujral | H04L 67/53 |
| 2020/0007536 | A1* | 1/2020 | Piel | G06Q 20/401 |
| 2020/0143374 | A1* | 5/2020 | Pitz | G06Q 20/4016 |
| 2021/0049597 | A1* | 2/2021 | Kumra | G06Q 20/3821 |
| 2021/0406889 | A1 | 12/2021 | Montiani Carvalho | |
| 2022/0076230 | A1* | 3/2022 | Grassadonia | G06Q 40/04 |
| 2022/0191198 | A1* | 6/2022 | Piel | G06Q 20/401 |
| 2022/0198453 | A1* | 6/2022 | Kruse | H04L 9/14 |
| 2023/0115345 | A1* | 4/2023 | Grassadonia | G06Q 40/04 705/44 |
| 2023/0401579 | A1* | 12/2023 | Kruse | H04L 9/14 |

OTHER PUBLICATIONS

International Search Report and Written Opinion of International Application No. PCT/US2019/049363, dated Nov. 27, 2019, 7 pages.
Office Action dated Nov. 26, 2021 for U.S. Appl. No. 17/273,241 (pp. 1-21).

* cited by examiner

IDENTITY AUTHENTICATION SYSTEMS AND METHODS

CROSS-REFERENCE

This application is a continuation application of U.S. Application Ser. No. 17/273,241, filed on Mar. 3, 2021, which is a national stage entry under 35 U.S.C. 371 of International Patent Application No. PCT/US19/49363, filed Sep. 3, 2019, which claims priority to U.S. Provisional Application No. 62/726,983, filed Sep. 4, 2018, the disclosure of which is incorporated by reference herein.

FIELD

The disclosure relates to systems and methods for identity authentication.

BACKGROUND

Many payment transactions involve merchants that may not be recognized by the issuer of a credit card or other payment account used for the transactions. In such transaction attempts, the issuer may reject the transaction even if the account user and the merchant are legitimate. In some jurisdictions, large numbers of potentially legitimate transactions may be denied for suspected fraud.

BRIEF DESCRIPTION OF THE DRAWINGS

The disclosure may be better understood by references to the detailed description when considered in connection with the accompanying drawings. The components in the figures are not necessarily to scale, emphasis instead being placed upon illustrating the principles of the disclosure. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In embodiments, the disclosure describes a computer-implemented method that may include receiving a first iteration of a transaction request associated with a user payment account and a merchant. The method may include requesting that merchant re-submit the transaction request, and requesting authentication from a user associated with the user payment account. The method may include authenticating the transaction request by matching an authentication parameter of the user received in response to the request with an authentication parameter known to be associated with the user payment account. Based on the authentication, approving a second iteration of the transaction request sent in response to the request to re-submit that transaction request.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

In some embodiments, the disclosure may describe enhanced authentication processing for high risk transactions. The processing allows merchants to re-submit a transaction request to permit time for an issuer to validate a client by pushing an authentication message to the client, having the client provide an authentication parameter, such as a biometric parameter or password, that may be compared to an authentication parameter previously provided to the issuer/authentication authority and maintained by the issuer/authentication authority, and, once verified, allows the issuer to inform the merchant that the customer has been validated.

In some embodiments, an identity authentication system may rely on International Organization for Standardization ("ISO") message with message type indicator ("MTI") codes (e.g., ISO 8583 MTI codes such as 0100-0110), which may be existing ISO response codes. In some embodiments, the identity authentication system may rely on no application, services or API to conduct authentication. In some embodiments, the identity authentication system may be used without requiring PII or Special Handling data flowing. In some embodiments, the identity authentication system may include a specialized authentication application provided by an issuer or other authentication authority to that may store and authenticate user authentication parameters.

In some embodiments, the identity authentication may be used for non 3D secure transaction that may be common in certain jurisdictions, or for other types of high risk transactions. However, it is also contemplated that the system disclosed herein may be used for more secure transaction types as well. In some embodiments, an issuer or other authentication authority may identify requests for high risk transactions and return to the merchant an ISO message file populated with a code instructing the merchant to re-submit the transaction request, (e.g., the code 019 in existing ISO code). The resubmission request may provide the issuer or authentication authority time and opportunity to validate the transaction request with a user associated with the payment account used to initiated the transaction. In some embodiments, the issuer may ask the user to provide additional authentication parameters, such as via a biometric verification method (finger print, photograph, facial recognition, voice, etc.). The merchant may then re-submit the transaction request, which may be validated based on the user's providing of an appropriate authentication parameter. In some embodiments, the user verification may give to the user a better experience because more legitimate transactions may be accepted that may have otherwise been denied without use of the identity authentication system described herein.

In some embodiments, the disclosure describes a computer-implemented method that includes receiving a first authentication parameter from a user that may be associated with a user payment account. The method may include receiving a first iteration of a transaction request from a merchant server, where the transaction request include an identifier of the user payment account and a merchant identifier. The method may include determining that the merchant identifier may be associated with an untrustworthy merchant, and transmitting a request to re-submit the transaction request to the merchant server. In response to determining that the merchant identifier may be associated with an untrustworthy merchant, the method may include transmitting an authentication request to a computing device associated with the user payment account. The method may include receiving a second authentication parameter from the computing device in response to the authentication request, and determining that the second authentication parameter matches the first authentication parameter. The method may also include receiving a second iteration of the transaction request from the merchant server in response to the request to re-submit the transaction request, and approving the second iteration of the transaction request based on the determination that the second authentication parameter matches the first authentication parameter.

In another embodiment, the disclosure describes a computer-implemented method comprising receiving a first iteration of a transaction request including an identifier of a user payment account, and determining that the transaction request may include a likelihood of fraud that exceeds a predetermined fraud threshold. Based on the determination that the transaction request includes a likelihood of fraud that exceeds the predetermined fraud threshold, the method may include transmitting an authentication request to a computing device associated with the user payment account and transmitting a request to re-submit the transaction request. In response to the authentication request, the method may include receiving an authentication parameter from the computing device. The method may include determining that the authentication parameter matches an authentication parameter associated with the user payment account. In response to the request to re-submit the transaction request, the method may include receiving a second iteration of the transaction request, and approving the second iteration of the transaction request based on the determination that the authentication parameter received from the computing device matches the authentication parameter associated with the user payment account.

In some embodiments, the disclosure describes a computer implemented method including receiving a first iteration of a transaction request including an identifier of a user payment account from a merchant server. In response to receiving the first iteration of the transaction request, the method may include transmitting an authentication request to a computing device associated with the user payment account and transmitting a request to re-submit the transaction request to the merchant server. The method may include receiving an authentication parameter from the computing device in response to the authentication request, and determining that the authentication parameter received from the computing device matches an authentication parameter associated with the user payment account. The method may include receiving a second iteration of the transaction request from the merchant server. Based on the determination that the authentication parameter received from the computing device matches the authentication parameter associated with the user payment account, the method may include approving the second iteration of the transaction request.

Figure 1:
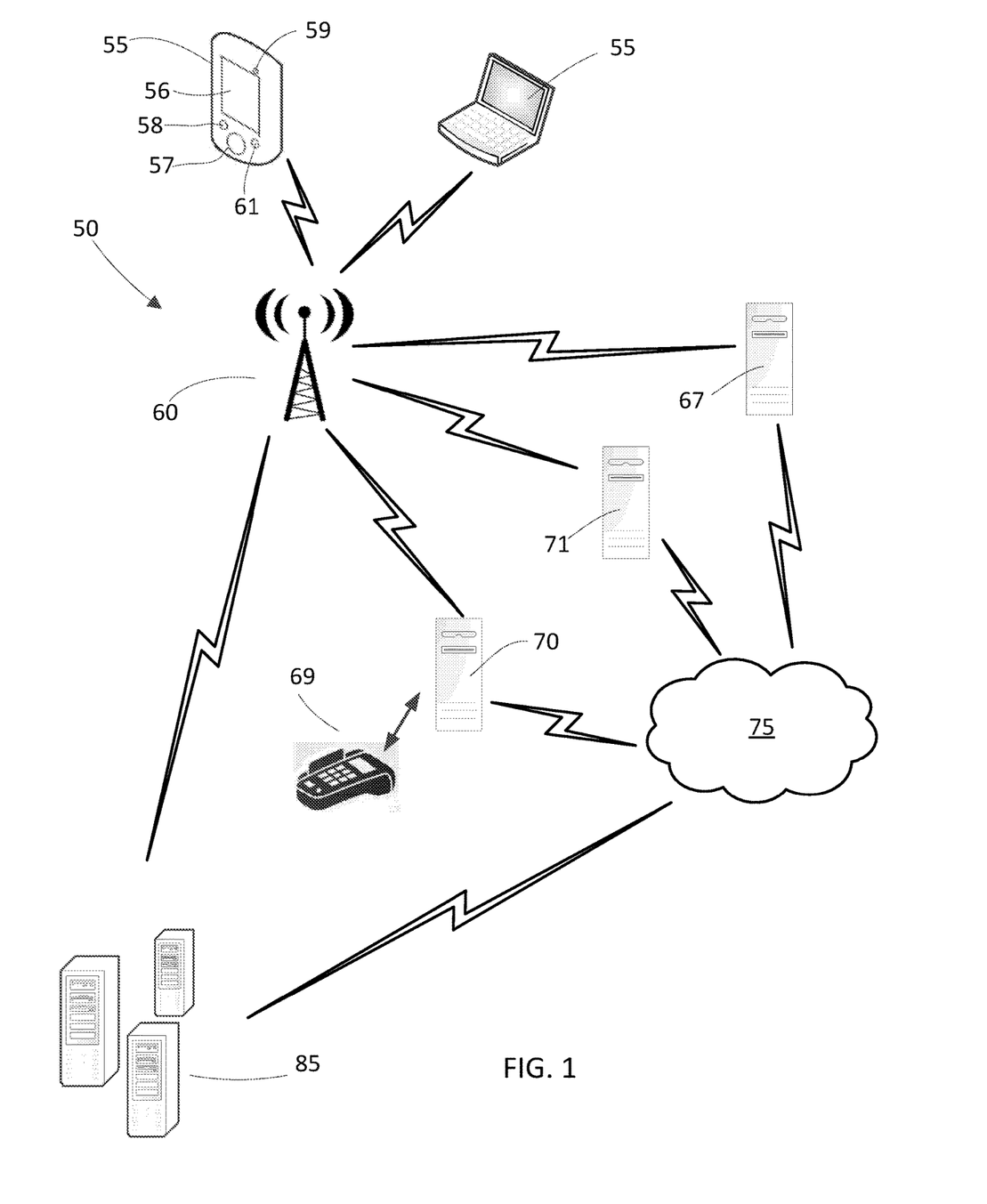
FIG. 1 is an illustration of the elements of an embodiment of a computer system that includes an identity authentication system as shown and described herein.

A high level illustration of some of the elements in a sample computing system 50 that may be physically configured to implement embodiments of methods for providing identity authentication system is illustrated in FIG. 1. The system 50 may include any number of computing devices 55, such as smart phones or tablet computers, mobile computing devices, wearable mobile devices, desktop computers, laptop computers, or any other computing devices that allow users to interface with a digital communications network, such as digital communication network 60, and to make electronic payments. Connection to the digital communication network 60 may be wired or wireless, and may be via the internet or via a cellular network or any other suitable connection service. Various other computer servers may also be connected via the digital communication network 60, such as one or more a merchant servers 70, an authentication server 85, an acquirer server 71, an issuer server 67. In some embodiments, the authentication server 85 and the issuer server 67 may be the same server, or may be operated by the same entity. The merchant server 70 may also be connected, either directly or over the digital communication network 60, to one or more point-of-sale (POS) devices 69, such as in a merchant store. In some embodiments, the POS devices may be capable of communicating directly with a computing device 55 to conduct electronic payments initiated by a user. Various of the servers or computer entities may also be connected through a secure payment network 75. The payment network 75 may be an electronic payment system used to accept, transmit, or process transactions made by users with payment cards for money, goods, or services, and to transfer information and funds among payment card issuers, merchants, payment card holders, payment processors, acquirers, etc. In the illustrated embodiment, at least the merchant server 70, the acquirer server 71, the issuer server 67, and the authentication server 85 may be connected via the payment network 75, but it is contemplated that other entities, such as the an acquirer or an issuer, may be connected as well. It is also contemplated that the authentication server 85 may also be connected to the one or more user devices 55 over the digital communication network 60.

In one embodiment, the computing device 55 may be a device that operates using a portable power source, such as a battery. The computing device 55 may also have a display 56 which may or may not be a touch sensitive display. More specifically, the display 56 may have a capacitance sensor, for example, that may be used to provide input data to the computing device 55. In other embodiments, an input pad 57 such as arrows, scroll wheels, keyboards, etc., may be used to provide inputs to the computing device 55. In addition, the computing device 55 may have a microphone 58 which may accept and store verbal data, a camera 59 to accept images and a speaker 61 to communicate sounds.

Figure 2:
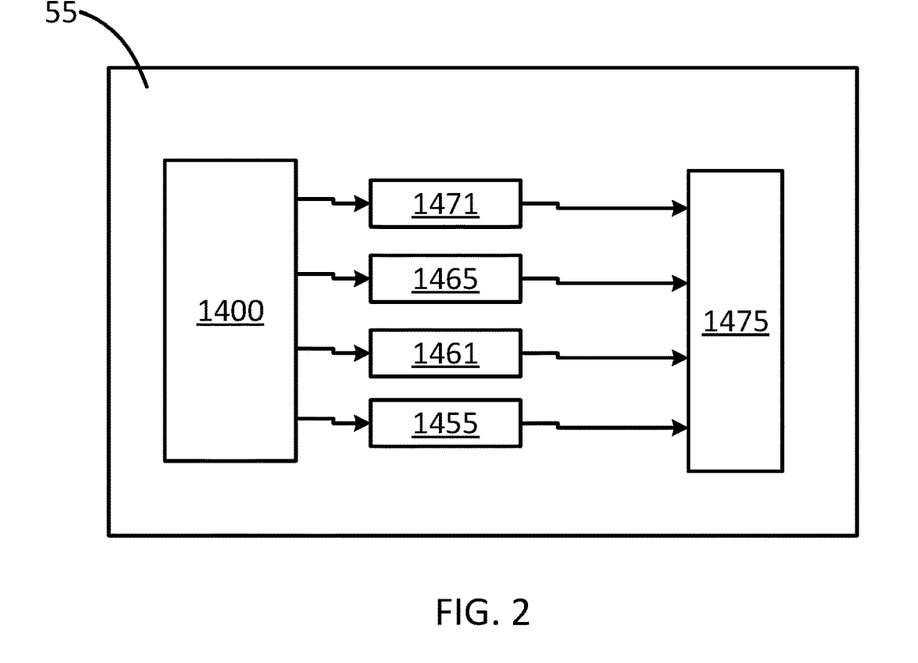
FIG. 2 is a schematic illustration of elements of an embodiment of an example computing device.
Figure 3:
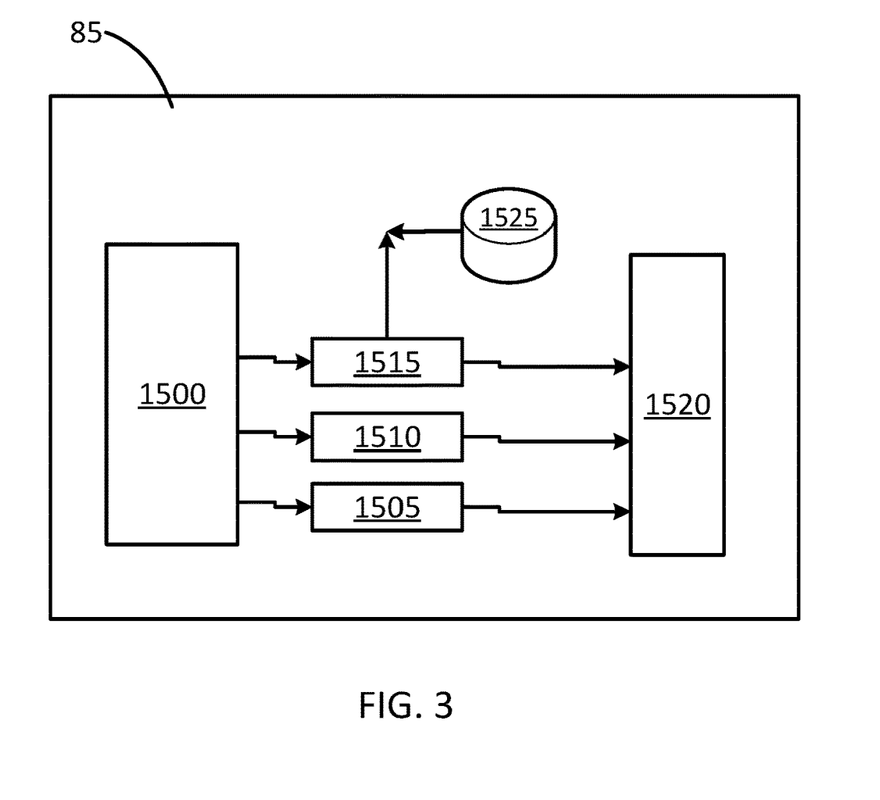
FIG. 3 is a schematic illustration of elements of an embodiment of an example server type computing device.

FIG. 2 is a simplified illustration of the physical elements that make up an embodiment of a computing device 55 and FIG. 3 is a simplified illustration of the physical elements that make up an embodiment of a server type computing device, such as the authentication server 85, but the merchant server 70, the issuer server 67, the acquirer server 71 may reflect similar physical elements in some embodiments. Referring to FIG. 2, a sample computing device 55 is illustrated that is physically configured according to be part of the computing system 50 shown in FIG. 1. The portable computing device 55 may have a processor 1451 that is physically configured according to computer executable instructions. In some embodiments, the processor can be specially designed or configured to optimize communication between the server 85 and the computing device 55 relating to the readiness index described herein. The computing device 55 may have a portable power supply 1455 such as a battery, which may be rechargeable. It may also have a sound and video module 1461 which assists in displaying video and sound and may turn off when not in use to conserve power and battery life. The computing device 55 may also have volatile memory 1465 and non-volatile memory 1471. The computing device 55 may have GPS capabilities that may be a separate circuit or may be part of the processor 1451. There also may be an input/output bus 1475 that shuttles data to and from the various user input/output devices such as a microphone, a camera 59, a display 56, or other input/output devices. The portable computing device 55 also may control communicating with the networks, such as communication network 60 in FIG. 1, either through wireless or wired devices. Of course, this is just one embodiment of the computing device 55 and the number and types of computing devices 55 is limited only by the imagination.

The physical elements that make up an embodiment of a server, such as the authentication server 85, are further illustrated in FIG. 3. In some embodiments, the authentication server is specially configured to provide identity authentication system described herein. At a high level, the authentication server 85 may include a digital storage such as a magnetic disk, an optical disk, flash storage, non-volatile storage, etc. Structured data may be stored in the digital storage such as in a database. More specifically, the server 85 may have a processor 1500 that is physically configured according to computer executable instructions. In some embodiments, the processor 1500 can be specially designed or configured to optimize communication between a computing device, such as computing device 55, and the server 85 relating to the identity authentication system as described herein. The server 85 may also have a sound and video module 1505 which assists in displaying video and sound and may turn off when not in use to conserve power and battery life. The server 85 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with the networks, such as communication network 60 and payment network 75, either through wireless or wired devices. In some embodiments, an identity authentication controller configured to implement methods related to the identity authentication system described herein may be located on the authentication server 85, or both the computing device 55 and the server 85. Of course, this is just one embodiment of the authentication server 85 and additional types of servers are contemplated herein.

Figure 4:
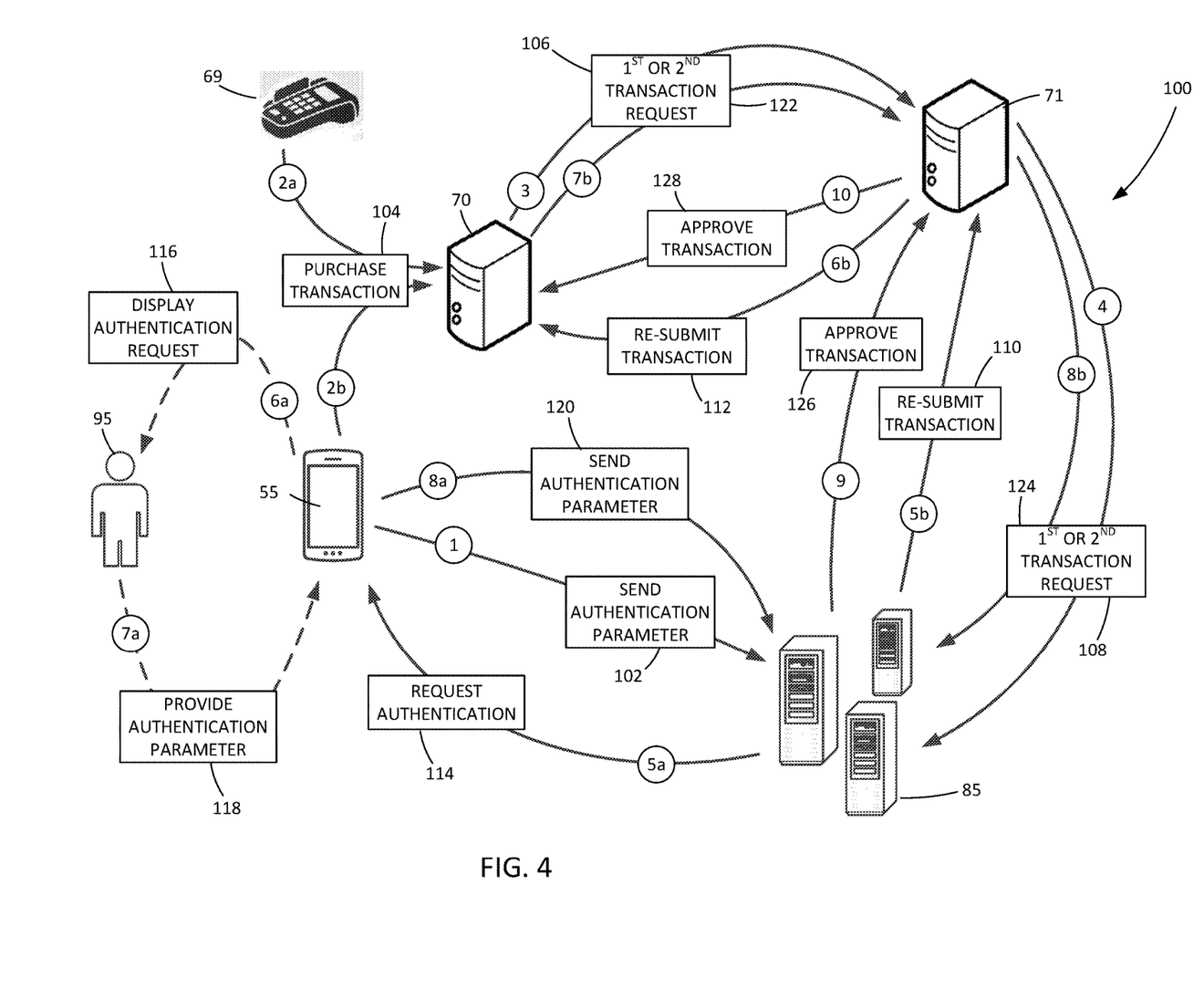
FIG. 4 is a data flow diagram of an embodiment of using the identity authentication system as shown and described herein.

FIG. 4 shows a data flow diagram 100 illustrating an embodiment of using the identity authentication system. At 102, a user 95 may use a computing device 55 to transmit an authentication parameter to the authentication server 85, such as via the communications network 60. In some embodiments, the authentication server 85 may be operated by an entity providing a payment account to a user 95, such as a credit card issuer, a bank, or other payment service for which the user may have a payment account. The authentication parameter may be any parameter or biometric verification unique to the user 95 that may confirm the user's identity, such as a finger print, photograph, voiceprint, password, token, facial identification, etc. The authentication server 85 may store the authentication parameter (e.g., in an authentication database) so as to associate the authentication parameter with the payment account with the user.

At 104, the user 95 may attempt a transaction using the user payment account. In some embodiments, the user 95 initiate the transaction via the computing device 55, or may use a POS device 69, such as in a store. A merchant server 70 associated with the attempted purchase transaction may, at 106, initiate a first iteration of a transaction request by transmitting transaction data to an acquirer server 71 for an acquirer associated with the merchant. In some embodiments, the transaction request may include an identifier of the user payment account (e.g., account number, token, etc.) and a merchant identifier identifying the merchant associated with the transaction. At 108, the acquirer server 71 may, such as via the payment network 75, transmit the first iteration of the transaction request to the authentication server 85. In some embodiments, the merchant server 106 may instead transmit the first iteration of the transaction request directly to the authentication server 85. The first iteration of the transaction request may be transmitted using an ISO message, such as ISO message code 0100, 1100, or 2100, for an authorization request.

In some embodiments, the authentication server may determine whether the transactions carries a high risk of fraud. In some embodiments, the risk may be determined at least partially based on whether the merchant is familiar to the authentication server or not. In some embodiments, the authentication server 85 may query a familiar merchant database in making this determination. Familiar merchants may be merchants that the authentication server 85 trusts to not conduct fraudulent transactions because of prior transactions or for other suitable reasons. Of course, other factors known to those skilled in the art may also be considered to determine the risk of fraud associated with the transaction request. If the authentication server 85 determines that the merchant is an unfamiliar or otherwise untrustworthy merchant or that the risk of fraud is above a certain threshold, the authentication server may, at 110, transmit a request to the acquirer server 71 to re-submit the transaction request. In some embodiments, the authentication server 85 may transmit the response using an ISO message, such as ISO message code 0110, 1110, or 2110. In such embodiments, the ISO message may include an authorization response code indicating that the transaction authorization request should be re-submitted. In some embodiments, the ISO message code to resubmit may be a filed populated with the numbers "019", indicating that the merchant or acquirer should re-submit that request at a later time (e.g., 5 to 10 minutes later). In some embodiments, at 112, the acquirer server 71 may transmit the request to re-submit the transaction to the merchant server 70, but may simply re-submit directly from the acquirer server 71 in some embodiments.

Figure 5:
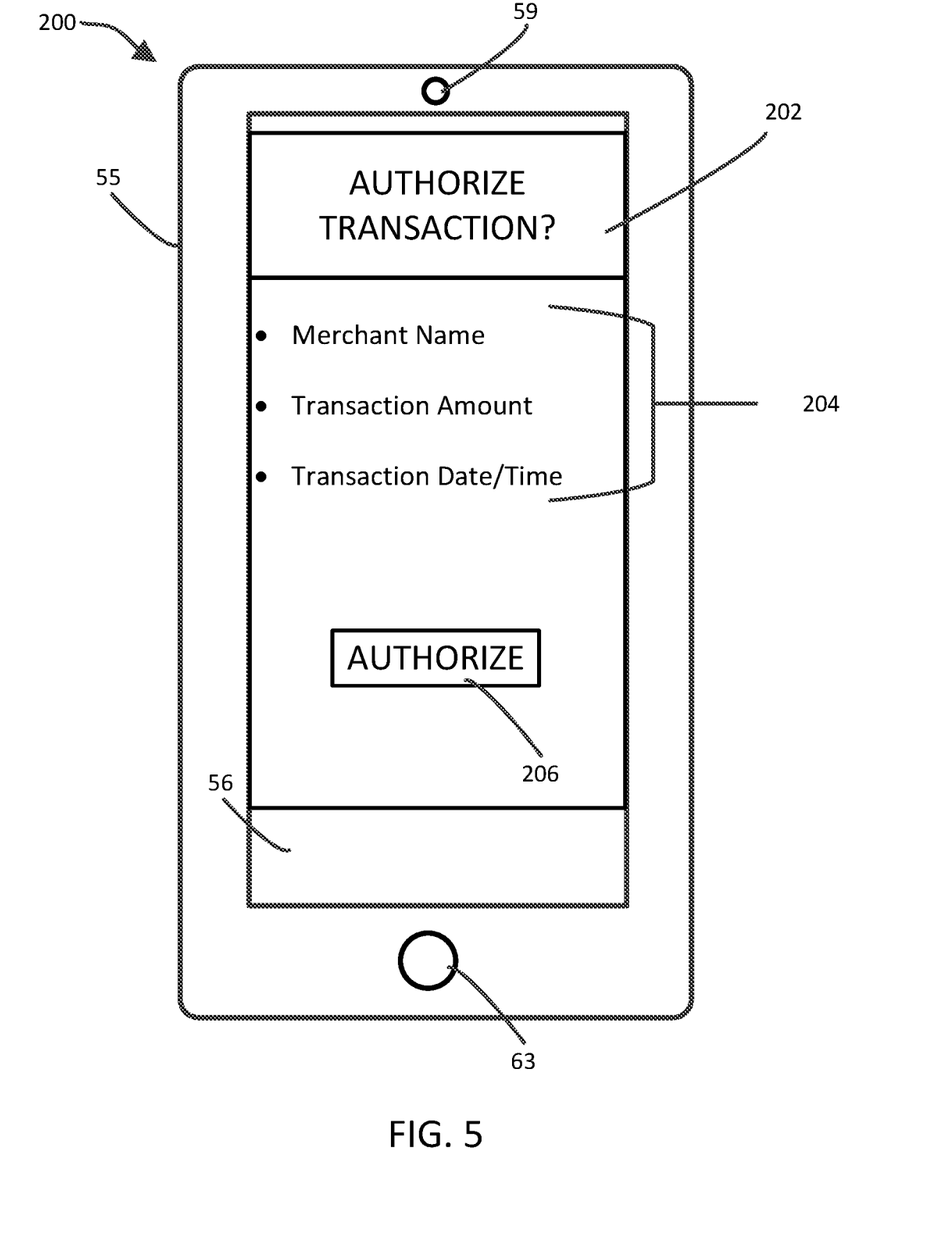
FIG. 5 is a an embodiment of a user interface of an authentication notification for the identity authentication system shown and described herein.

At 114, in response to determining that that merchant is an unfamiliar merchant of that the risk of fraud is above a threshold, the authentication server 85 may transmit, at 114, an authentication request to the user's computing device 55. At 116, the computing device 55 may display an authentication request to the user 95 requesting that the user confirm that the requested transaction is not fraudulent. In some embodiments, the authentication request may include information related to the transaction request, such as the merchant name, the transaction amount, location and/or time of the transaction request, etc. In some embodiments, the authentication request may be provided via native notification functionality of the computing device 55, via text message, email, etc. In some embodiments, the authentication request may be pushed to the computing device 55 and displayed via an application associated with the authentication server 85 or an entity controlling the authentication server, such as a bank, credit card issuer, etc. An example user interface showing an exemplary authentication request is shown in FIG. 5. In some embodiments, the user 95 may determine whether the requested transaction is legitimate or not. If the user 95 suspects that the transaction may be fraudulent, the user may respond with an indication denying authorization. If the user determines that the transaction request is legitimate (e.g., likely not fraudulent), the user may, at 118, provide an authorization parameter that may prove the user's identity and prove that the requested transaction was, in fact, initiated by the user. In some embodiments, the user may enter a password, submit a fingerprint scan, show the user's face to the camera of the computing device for facial recognition, retina scan, etc., to provide the authentication parameter. In some embodiments, the user may merely select a button or other response to confirm that the transaction is legitimate, and the computing device 55 may have stored authentication parameters to send along once the user has logged into the computing device.

At 120, in response to the user's confirmation or providing of the authentication parameter, the computing device 55 may transmit the authentication parameter to the authentication server 85. The authentication server 85 may compare the authentication parameter to the stored authentication parameter associated with the user payment account. In some embodiments, if the authentication parameters match, the authentication server 85 may determine that the request is legitimate. In some embodiments, the authentication server 85 may add the merchant associated with the requested transaction to the familiar merchants based on the user's confirmation of the transaction.

At 122, the merchant server 70 may transmit a second iteration of the transaction request to the acquirer server 71, which may be submitted using the ISO message code 0100, 1100, or 2100. At the 124, the acquirer server 71 may then submit the second iteration of the transaction request to the authentication server 85. Once again, the authentication server 85 may determine whether the transaction request is legitimate or likely to be fraudulent. Based on the matching authentication parameter received from the computing device 55 in reference to the transaction request, the authentication server 85 may determine that the transaction is likely legitimate and, at 126, transmit an approval message to the acquirer server 71. In some embodiments, the authentication server 85 may once again check to see whether the merchant associated with the transaction request is stored in a familiar merchant database. Based on the authentication received from the user's computing device 55, the authentication server 85 may have added the previously unfamiliar merchant to the familiar merchant database. Because the merchant requesting the transaction matches a familiar merchant, the authentication server may proceed with approving the transaction at 126. At 128, the acquirer server 71 may transmit the transaction approval along to the merchant server 70 to complete the transaction.

FIG. 5 shows an exemplary user interface 200 that may be used to display an authorization request 202 to a user via the display 56 of a user's computing device 55. The authorization request 202 may a notification on the computing device 55 associated with the user that may be registered with the authorization server 85 as associated with the user and the user payment account. In some embodiments, the authorization request 202 may be pushed to the computing device 55 and be configured to be displayed relatively quickly after the requested transaction so as to provide for transaction authorization before the second iteration of the transaction request is received by the authentication server 85. In some embodiments, the authorization request 202 may include a transaction details portion 204, which may include information such as the name of the merchant associated with the requested transaction, the transaction amount of the requested transaction, the transaction date/time of the requested transaction, etc. The authorization request 202 may also include an authorization indicator such as an authorization button 206. If, upon reviewing the transaction details 204 in the authorization request 202, the user determines that the transaction is legitimate, the user may authorize the transaction by selecting the authorization button 206. In some embodiments, the user may be requested to provide an authentication parameter to verify the user's identity. In some embodiments, the authentication parameter may be biometric data, such as a fingerprint that may be read by a fingerprint reader 63 on the device, a retina scan or facial recognition such as with the camera 59, or other biometric information. In some embodiments, the authentication parameter may be a password or other authentication information specific to the user.

Figure 6:
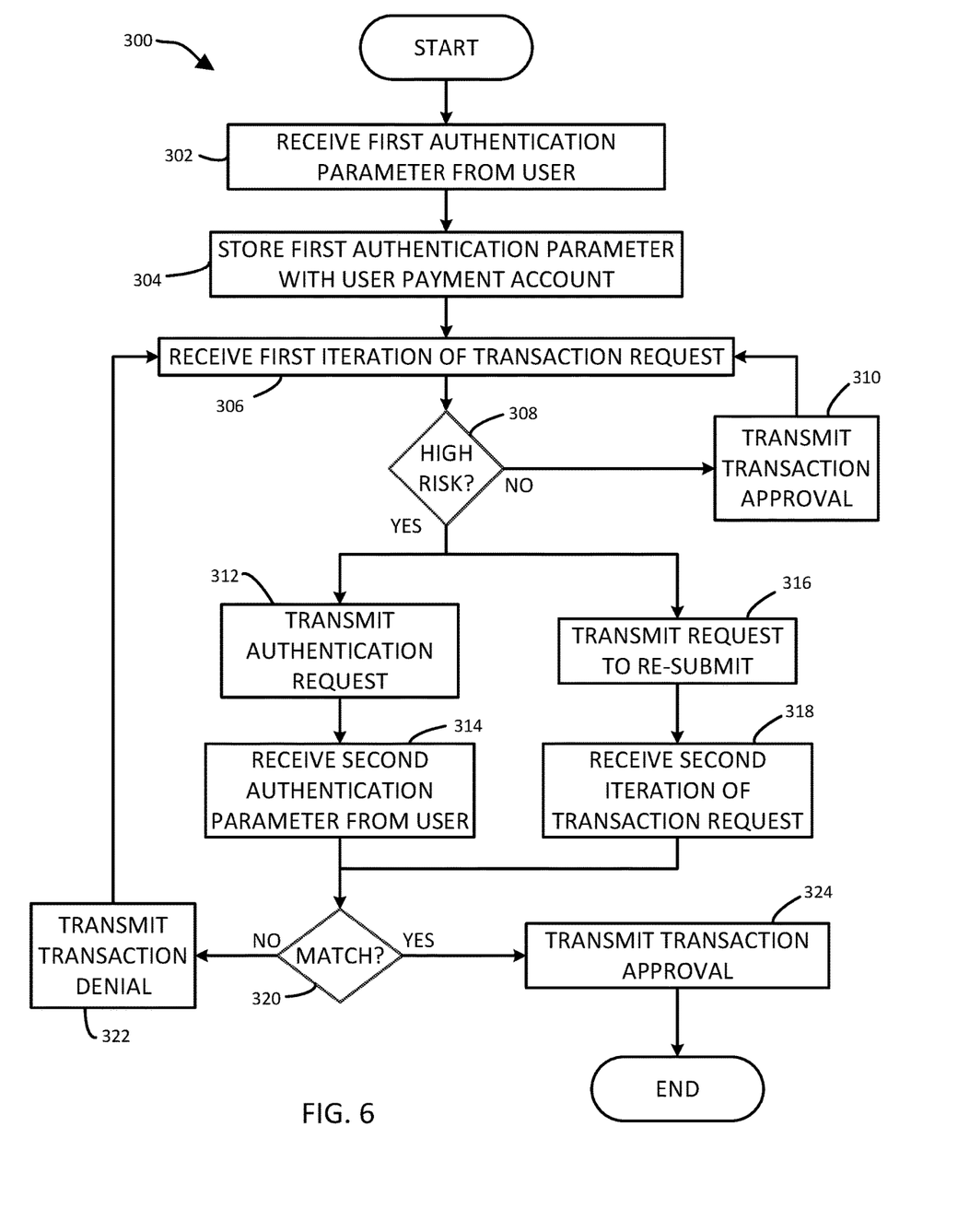
FIG. 6 is a flow chart of an embodiment of a method for using the identity authentication system as shown and described herein.

FIG. 6 is a flow chart of an embodiment of a method 300 of using the identity authentication system described herein. At 302, an issuer server or an authentication server (or both) may receive a first authentication parameter from a user. The first authentication parameter may be received in the course of setting up a user payment account and the may be associated with the user payment account. As described above, the first authentication parameter may be any of a variety of identity verification tools, such as fingerprint, facial recognition, password, etc. At 304, the first authentication parameter may be stored as associated with a user payment account of the user. In some embodiments, the first authentication parameter may be stored in an account database that may be housed on the authentication server, the issuer server, or elsewhere. At 306, the method may include receiving a first iteration of a transaction request from a merchant server, a payment gateway, or an acquirer associated with a merchant. The transaction request may include at least an identifier of the user payment account (e.g., account number, token, username, etc.) and a merchant identifier (e.g., merchant name, merchant identification number, etc.). The transaction request may also include additional transaction data, such as the transaction amount, the item(s) being purchased, the location of the transaction request, the date and/or time of the transaction request, etc. At 308, the method may include determining whether the transaction request is associated with a high risk of fraud or other illegitimate purpose. In some embodiments, this determination may include determining whether the merchant identified in the transaction request is familiar to the authentication server or issuer server as a legitimate merchant. In some embodiments, this may be determined based on previous contact with the merchant, based on a database of trusted merchants, etc.

If it is determined that the merchant identified in the transaction request is a trusted merchant or the transaction otherwise carries a relatively low risk (e.g., below a risk threshold), at 310, the authorization server may transmit a transaction approval to the merchant server or acquirer server. If the merchant untrustworthy or the transaction is determined to carry a relatively high risk (e.g., above a risk threshold), at 316, the authentication server or issuer server may transmit a request for the merchant server to re-submit the transaction request at a later time and also transmit, at 312, an authentication request to a computing device associated with the user payment account. In some embodiments, the request to re-submit the transaction request may be transmitted using ISO MTI codes, such as ISO 8583 MTI message code 0110 including an indication requesting resubmission of the transaction request. At 318, the authentication server may receive a second iteration of the transaction request in response to the request to re-submit the transaction request. At 314, the method may also include receiving a second authentication parameter from the user, e.g., via the computing device. At 320, the method may include determining whether the second authentication parameter from the user matches the first authentication parameter associated with the user payment account. If the first and second authentication parameters do not match, in some embodiments, at 322, the method may include transmitting a transaction denial. If, however, the first and second authentication parameters are found to match, at 324, the authentication server may transmit a transaction approval to the merchant server, authorizing the requested transaction to proceed.

Thus, those skilled in the art will recognize that the identity authentication system described herein may provide a technical solution to the technical problem of confirming whether a merchant or overall transaction is legitimate or a result of fraud. The technical solution described herein may be particularly useful when the security or legitimacy of a transaction may otherwise be difficult to confirm because of jurisdiction, merchant type, etc. At least on practical application of the identity authentication system described herein may be to reduce the number of transaction requests that may otherwise be denied without the system in place. A user will therefore have higher satisfaction with the payment account or credit card used to enter transactions because transactions legitimate transactions that may otherwise be suspected as fraudulent and wrongfully denied may be approved using the described system.

The various participants and elements described herein may operate one or more computer apparatuses to facilitate the functions described herein. Any of the elements in the above-described Figures, including any servers, user terminals, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++ or Perl using, for example, conventional or object-oriented techniques. In some examples, the at least one processor may be specifically programmed.

The software code may be stored as a series of instructions, or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed (or physically configured) to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer-implemented method comprising:
receiving, at an authentication server, a transaction request from a merchant;
determining, by the authentication server via one or more processors, that the merchant is an untrustworthy merchant;
transmitting, from the authentication server, an International Organization for Standardization (ISO) message type indicator (MTI) file populated with a code requesting that the untrustworthy merchant re-submit the transaction request based on the determination that the merchant is an untrustworthy merchant;
transmitting, from the authentication server, an authentication request to a computing device associated with the transaction request;
in response to the authentication request, receiving, at the authentication server, an authentication parameter from the computing device, the authentication parameter approving the transaction request from the untrustworthy merchant;
receiving, at the authentication server, a re-submission of the transaction request from the untrustworthy merchant in response to the code requesting that the untrustworthy merchant re-submit the transaction request; and
approving, by the authentication server via the one or more processors, the transaction request based on the authentication parameter approving the transaction request from the untrustworthy merchant.

2. The method of claim 1, wherein the authentication parameter is a fingerprint of a user associated with the transaction request.

3. The method of claim 1, wherein the authentication parameter is a facial recognition of a user associated with the transaction request.

4. The method of claim 1, wherein the authentication parameter is a password.

5. The method of claim 1, wherein the authentication request is configured to trigger a notification on the computing device.

6. The method of claim 5, wherein the authentication request is configured to receive an authentication confirmation from a user associated with the transaction request.

7. The method of claim 1 further comprising establishing a predetermined authentication parameter associated with the computing device.

8. The method of claim 7 further comprising determining that the authentication parameter received in response to authentication request matches the predetermined authentication parameter associated with the computing device.

9. A computer-implemented method comprising:
receiving, at an authentication server, a transaction request;
determining, by the authentication server via one or more processors, that the transaction request comprises a likelihood of fraud that exceeds a predetermined fraud threshold;
transmitting, from the authentication server:
an authentication request to a computing device associated with the transaction request, and
an International Organization for Standardization (ISO) message type indicator (MTI) file populated with a code requesting re-submission of the transaction request based on the determination that the transaction request comprises a likelihood of fraud that exceeds a predetermined fraud threshold;
in response to the authentication request, receiving, at the authentication server, an authentication parameter from the computing device;
receiving, at the authentication server, a re-submission of the transaction request; and
approving, by the authentication server via the one or more processors, the transaction request based on receiving the authentication parameter.

10. The method of claim 9, wherein the authentication parameter is a fingerprint of a user associated with the transaction request.

11. The method of claim 9, wherein the authentication parameter is a facial recognition of a user associated with the transaction request.

12. The method of claim 9, wherein the authentication parameter is a password.

13. The method of claim 9, wherein the authentication request is configured to trigger a notification on the computing device.

14. The method of claim 13, wherein the authentication request is configured to receive an authentication confirmation from a user associated with the transaction request.

15. The method of claim 9, wherein the transaction request further comprises determining that a merchant associated with the transaction request is an untrustworthy merchant.

16. A computer-implemented method comprising:
receiving, at an authentication server, a first iteration of a transaction request from a merchant;
determining, by the authentication server via one or more processors, that the merchant is an untrustworthy merchant;
transmitting, by the authentication server:
an authentication request to a computing device associated with the transaction request, and
an International Organization for Standardization (ISO) message type indicator (MTI) file populated with a code requesting re-submission of the transaction request based on the determination that the merchant is an untrustworthy merchant;
receiving, at the authentication server, an authentication parameter from the computing device in response to the authentication request;

receiving, at the authentication server, a second iteration of the transaction request from the untrustworthy merchant in response to the code requesting re-submission of the transaction request; and based on the authentication parameter received from the computing device, approving, by the authentication server via the one or more processors, the second iteration of the transaction request.

17. The method of claim 16, wherein the authentication request is configured to trigger a notification on the computing device.

18. The method of claim 16, wherein the authentication request is configured to receive an authentication confirmation from a user associated with the transaction request.

19. The method of claim 16 further comprising establishing a predetermined authentication parameter associated with the computing device.

20. The method of claim 19 further comprising determining that the authentication parameter received in response to authentication request matches the predetermined authentication parameter associated with the computing device.

\* \* \* \* \*